(12) United States Patent
Rehman (10) Patent No.: US 12,545,022 B2
(45) Date of Patent: Feb. 10, 2026

(54) MAGNETIC ENCODER POSITION SENSOR FOR REMOTELY ADJUSTING REGISTRATION OR PRINT PRESSURE OF A CAN DECORATOR

(71) Applicant: Stolle Machinery Company, LLC, Centennial, CO (US)

(72) Inventor: Fazal Rehman, Aurora, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

(21) Appl. No.: 18/897,464

(22) Filed: Sep. 26, 2024

(65) Prior Publication Data

US 2025/0262852 A1    Aug. 21, 2025

Related U.S. Application Data

(60) Provisional application No. 63/554,330, filed on Feb. 16, 2024.

(51) Int. Cl.
*B41F 33/00* (2006.01)
*B41F 17/22* (2006.01)
(Continued)

(52) U.S. Cl.
CPC .......... *B41F 33/0009* (2013.01); *B41M 1/40* (2013.01); *G01B 7/30* (2013.01); *G01D 5/145* (2013.01); *G01D 5/16* (2013.01)

(58) Field of Classification Search
None
See application file for complete search history.

(56) References Cited

U.S. PATENT DOCUMENTS

| 2015/0010257 A1* | 1/2015 | Mor-Yosef | F16C 19/55 384/494 |
| --- | --- | --- | --- |
| 2018/0264804 A1 | 9/2018 | Chishiki et al. | |

(Continued)

OTHER PUBLICATIONS

U.S. Patent and Trademark Office, ISA/US, PCT Application No. PCT/US2024/049368, International Search Report and Written Opinion, Dec. 4, 2024, 19 pages.

*Primary Examiner* — Joshua D Zimmerman
(74) *Attorney, Agent, or Firm* — Eckert Seamans Cherin & Mellott, LLC (57) ABSTRACT

A remote registration and print pressure adjustment system includes a can decorator including a plurality of plate cylinders and a plurality of inking stations, each plate cylinder being associated with an individual inking station; a magnetic encoder position sensor disposed in proximity to a rotatory component of the can decorator and structured to detect rotational position parameters of the rotatory component; and a remote registration and print pressure control system structured to receive a position signal including the rotational position parameters from the magnetic encoder position sensor, determine the linear distance based on the position signal and instant position of one of the registration mechanism and the print pressure adjustment mechanism based on the determined linear distance, and cause a corresponding actuator of the rotatory component to adjust the rotational positional parameters based on the instant position of one of the registration mechanism and the print pressure adjustment mechanism.

10 Claims, 6 Drawing Sheets

(51) Int. Cl.
 *B41M 1/40* (2006.01)
 *G01B 7/30* (2006.01)
 *G01D 5/14* (2006.01)
 *G01D 5/16* (2006.01)

(56) References Cited

U.S. PATENT DOCUMENTS

2019/0270298 A1 9/2019 Davies
2021/0170741 A1 6/2021 Sebesta et al.
2022/0410555 A1 12/2022 Kajfosz et al.

* cited by examiner

MAGNETIC ENCODER POSITION SENSOR FOR REMOTELY ADJUSTING REGISTRATION OR PRINT PRESSURE OF A CAN DECORATOR

CROSS REFERENCE TO RELATED APPLICATIONS

This application claims priority to U.S. Provisional Patent Application Ser. No. 63/554,330, filed Feb. 16, 2024, entitled, MAGNETIC ENCODER POSITION SENSOR FOR REMOTELY ADJUSTING REGISTRATION OR PRINT PRESSURE OF A CAN DECORATOR, which is incorporated herein by reference in its entirety.

FIELD OF THE INVENTION

The disclosed concept relates generally to a system and method for decorating cans using a can decorator and, more particularly, to a magnetic encoder position sensor for remotely adjusting registration or print pressure of a can decorator.

BACKGROUND OF THE INVENTION

Figure 1:
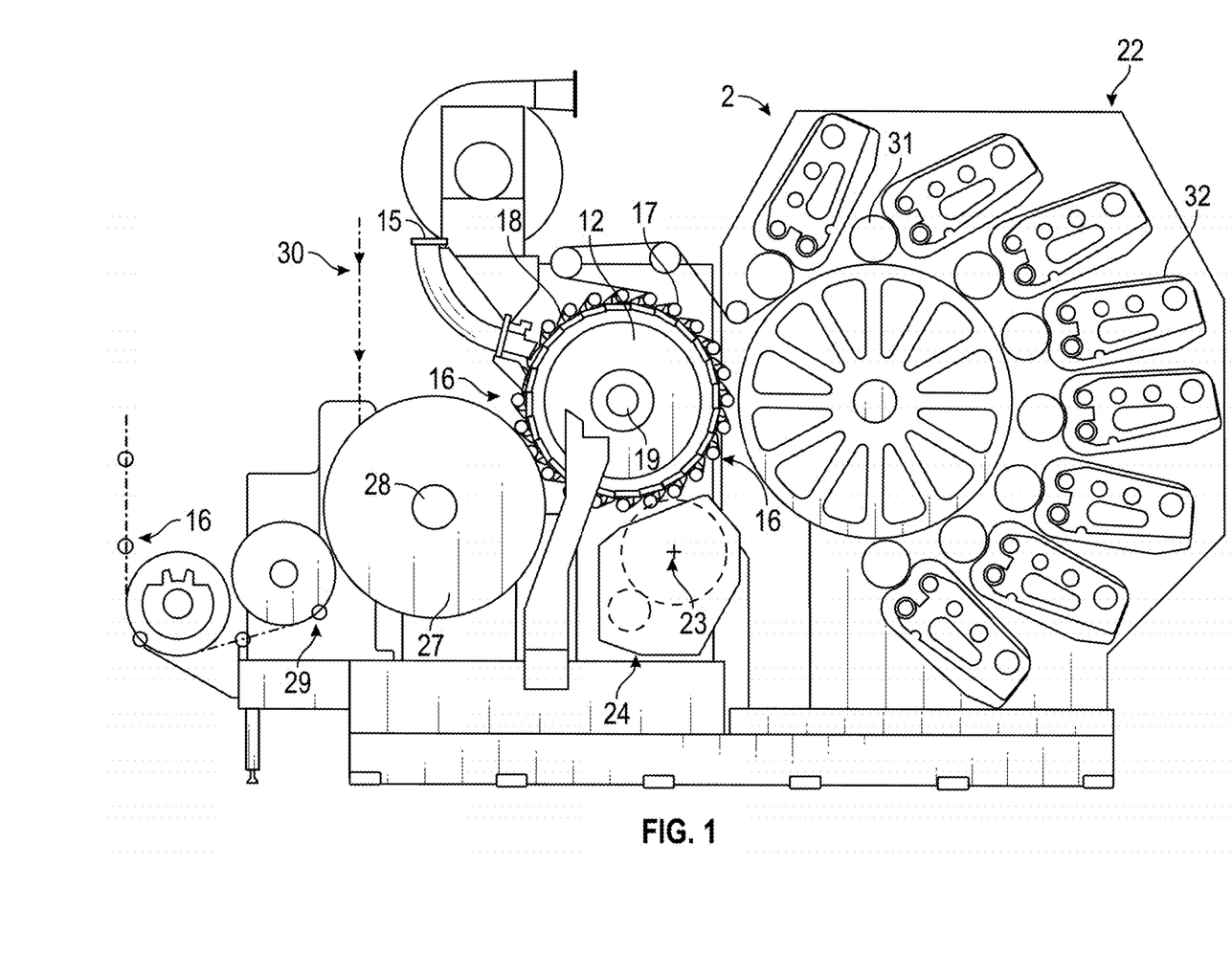
FIG. 1 is a side elevation view of an exemplary can decorator.

High speed continuous motion machines for decorating cans, commonly referred to as "can decorator machines" or simply "can decorators," are generally well known. FIG. 1 shows a can decorator 2. As shown in FIG. 1, a can decorator 2 includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket wheel engages a plurality of plate cylinders 31, each of which is associated with an individual inking station 32 (exemplary eight inking stations 32 are shown in FIG. 1). An inking station 32 may be also referred to herein as an inking station assembly 32. The plurality of plate cylinders 31 and the inking stations 32 place a label on a can 16 based on a specification from a vendor. Typically, each inking station 32 provides a different color ink and each plate cylinder 31 applies a different ink image segment to the blanket. All of the "ink image" segments combine to produce a "main image" (i.e., a label) that is structured to be applied to the can body. The "main image" is then transferred to undecorated cans 16 and becomes, as used herein, the "can body applied image."

Each inking station 32 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain 33 being at the "upstream" end of the ink train and a plate cylinder 31 at the "downstream" end of the ink train.

The ink train extends over a number of rolls each of which has a purpose. The ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the plate cylinder 31. For example, the oscillator rolls are structured to reciprocate longitudinally about their axis of rotation so as to spread the ink as it is applied to the next downstream roll. The final roll is the plate cylinder 31 which applies the ink to the blanket. It is understood that each inking station 32 applies an "ink image" of a single selected color to the blanket and that each inking station 32 must apply the ink image in a proper position relative to the other ink images so that the main image does not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an inking station 32 with blue ink would provide an ink image that is a blue rectangle, an inking station 32 with white ink would provide an ink image that is a white rectangle and an inking station 32 with red ink would provide an ink image that is a red rectangle. Further, presuming that the main image was of a French flag with the hoist side on the left, the inking station 32 with blue ink would provide the blue rectangle ink image on the left side of the blanket, the inking station 32 with white ink would provide the white rectangle ink image on the center of the blanket immediately adjacent the blue rectangle ink image, and the inking station 32 with red ink would provide the red rectangle ink image on the right side of the blanket immediately adjacent the white rectangle ink image. Once all the ink images are applied to the blanket, the main image is formed and then applied to a can body.

Each ink station assembly 32 is structured so that the final rolls before the printing cylinder 31 apply a proper amount of ink to the printing cylinder 31. Those of skill in the art know the amount of ink required so as to produce an image with an intended clarity, resolution and hue. Thus, as would be understood by those of skill in the art, and as used herein, the "proper" amount of ink is an amount that is neither too little (which typically results in a faint image) nor too much (which typically results in a blurred image), i.e., a "proper" amount of ink is an amount of ink that results in the image being produced with the intended clarity, resolution and hue. Further, the "proper" amount of ink applied to a printing cylinder 31 is also a film with a substantially consistent thickness. It is understood that those of skill in the art know the amount of ink to be applied to a substrate such as, but not limited to a can body, that is required to produce an image with the intended clarity, resolution and hue. The amount of ink applied may be controlled by adjusting print pressure between a printing plate and the blanket wheel.

Figure 1A:
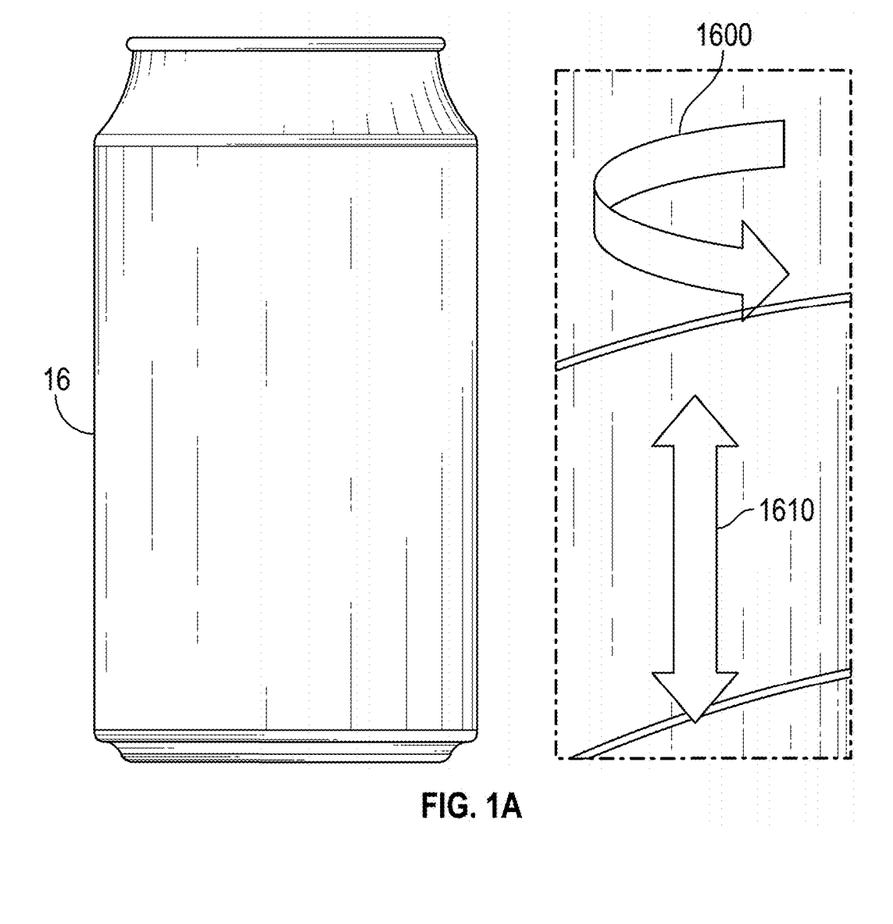
FIG. 1A illustrates circumferential and sidelay registration during can decorating.

Each plate cylinder 31 must be positioned so as to ensure the ink images are in proper registration. As would be understood by those of skill in the art, and as used herein, the "registration" of an "ink image" means that each ink image is substantially in the proper location. The "proper location" of the ink image means that the ink image is applied to the blanket in the position intended relative to the other ink images applied by other ink station assemblies 32 and that all ink images form a main image wherein the individual ink images do not overlap in an unintended manner. Further, the "proper location" of the ink images means that the ink images, and therefore the main image, has the intended sidelay registration and the intended circumferential registration relative to the other ink images so that the plurality of ink images form the main image. "Circumferential" registration means registration of the ink image in an axial direction around the can 16 as shown by the arrow 1600 and "sidelay" registration means registration in an up/down direction associated with the can 16 as shown by the arrow 1610 in FIG. 1A. As used herein, the "intended" sidelay/circumferential registration means that the sidelay/circumferential registration is such that the can body applied image is the intended image. As used herein, the "intended image" means the image as created by the creator of the image, as would be understood by those of skill in the art. As used herein, the "can body applied image" means the image as applied to a can body; i.e., the image that is on the can body after a printing operation is complete.

Registration and/or print pressure may be controlled manually on site at location of the can decorators by a technician who monitors the can decorator output and manually adjusts various elements of the ink station assemblies and/or the blanket wheel so that the ink is applied in a proper amount and in a proper position. Alternatively, it can be controlled by a remote registration adjustment mechanism coupled to the can decorator. For remote registration and/or print pressure adjustment, linear positioning sensors are typically used to detect instant position of the rotatory parts. For example, linear inductive sensors have been used to measure linear distance in plate cylinder motion such that registration and/or print pressure adjustment may be controlled remotely based the measured linear distance. That is, the position of a registration mechanism may be detected by measuring linear distance of a plate cylinder by a linear inductive sensor disposed in proximity to a rotatory component such as a plate cylinder gear. The linear inductive sensors may be inductive analog sensors and monitor registration and print pressure position feedback and measures the linear distance of the plate cylinder moved by the rotations of the plate cylinder gear based on the feedback. However, the linear inductive sensors have limited resolution and repeatability. Their performance is also affected by extreme temperatures, cutting fluids or chemical affects to which the can decorators in general are exposed. Accordingly, the accuracy of the linear inductive sensors has been limited, resulting in errors in detecting positions of rotatory machine parts (e.g., without limitation, the plate cylinder gear) associated with registration and/or print pressure position.

Any error in registration and/or print pressure position may cause the position of an image to be skewed or misprinted, or result in inefficient levels of ink for a specified optimal temperature required to apply an image on a container. In some instances, there is overlay of print layers which results in ink contamination and undesired colors being printed on the can. In this circumstance, hundreds or thousands of cans need to be discarded and the decorator needs to be shut down, leading to the can line as a whole being shut down and typically production loss between 400 and 6000 cans per minute. This stoppage results in higher operating costs and large amounts of spoilage.

There is room for improvement in the can manufacturing process.

There is room for improvement in detecting positions of registration and print pressure mechanisms moved by rotatory components of can decorators.

SUMMARY OF THE INVENTION

These needs, and others, are met by a remote registration and print pressure adjustment system including a can decorator including a plurality of plate cylinders and a plurality of inking stations, each plate cylinder being associated with an individual inking station; a magnetic encoder position sensor disposed in proximity to a rotatory component of the can decorator and structured to detect rotational position parameters of the rotatory component, the rotatory component being structured to move one of a registration mechanism and a print pressure adjustment mechanism by a linear distance based on rotations of the rotatory component; and a remote registration and print pressure control system communicatively coupled to the can decorator and the magnetic encoder position sensor, the remote registration and print pressure control system being structured to receive a position signal including the rotational position parameters from the magnetic encoder position sensor, determine the linear distance based on the position signal and instant position of one of the registration mechanism and the print pressure adjustment mechanism based on the determined linear distance, and cause a corresponding actuator of the rotatory component to adjust the rotational positional parameters based on the instant position of one of the registration mechanism and the print pressure adjustment mechanism.

Another example embodiment of the disclosed concept provides a method of remotely adjusting registration for a can decorator. The method includes: providing a remote registration adjustment system that comprises: (i) a can decorator including a plurality of plate cylinders and a plurality of inking stations, each plate cylinder being associated with an individual inking station; (ii) a magnetic encoder position sensor disposed in proximity to a rotatory component of the can decorator and structured to detect rotational position parameters of the rotatory component, the rotatory component being structured to move a registration mechanism by a linear distance based on rotations of the rotatory component; and (iii) a remote registration and print pressure control system communicatively coupled to the can decorator and the magnetic encoder position sensor, the remote registration and print pressure control system being structured to receive a position signal including the rotational position parameters from the magnetic encoder position sensor, determine the linear distance based on the position signal and instant position of the registration mechanism based on the determined linear distance, and cause a corresponding actuator of the rotatory component to adjust the rotational positional parameters based on the instant position of the registration mechanism; detecting, by the magnetic encoder position sensor, the rotational position parameters of the rotatory component; receiving, by the remote registration control system, the position signal from the magnetic encoder position sensor; determining, by the remote registration control system, the linear distance based on the position signal and instant position of the registration mechanism based on the determined linear distance; and causing, by the remote registration control system, a corresponding actuator of the rotatory component to adjust the rotational positional parameters based on the instant position of the registration mechanism.

Yet another example embodiment provides a method of remotely adjusting print pressure of a can decorator. The method comprises: providing a remote print pressure adjustment system that comprises: (i) a can decorator including a plurality of plate cylinders and a plurality of inking stations, each plate cylinder being associated with an individual inking station; (ii) a magnetic encoder position sensor disposed in proximity to a rotatory component of the can decorator and structured to detect rotational position parameters of the rotatory component, the rotatory component being structured to move a print pressure adjustment mechanism by a linear distance based on rotations of the rotatory component; and (iii) a remote registration and print pressure control system communicatively coupled to the can decorator and the magnetic encoder position sensor, the remote registration and print pressure control system being structured to receive a position signal including the rotational position parameters from the magnetic encoder position sensor, determine the linear distance based on the position signal and instant position of the print pressure adjustment mechanism based on the determined linear distance, and cause a corresponding actuator of the rotatory component to adjust the rotational positional parameters based on the instant position of the print pressure adjustment mechanism; detecting, by the magnetic encoder position sensor, the rotational position parameters of the rotatory component; receiving, by the remote registration control system, the position signal from the magnetic encoder position sensor; determining, by the remote registration control system, the linear distance based on the position signal and instant position of the print pressure adjustment mechanism based on the determined linear distance; and causing, by the remote registration control system, a corresponding actuator of the rotatory component to adjust the rotational positional parameters based on the instant position of the print pressure adjustment mechanism.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together or act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 2:
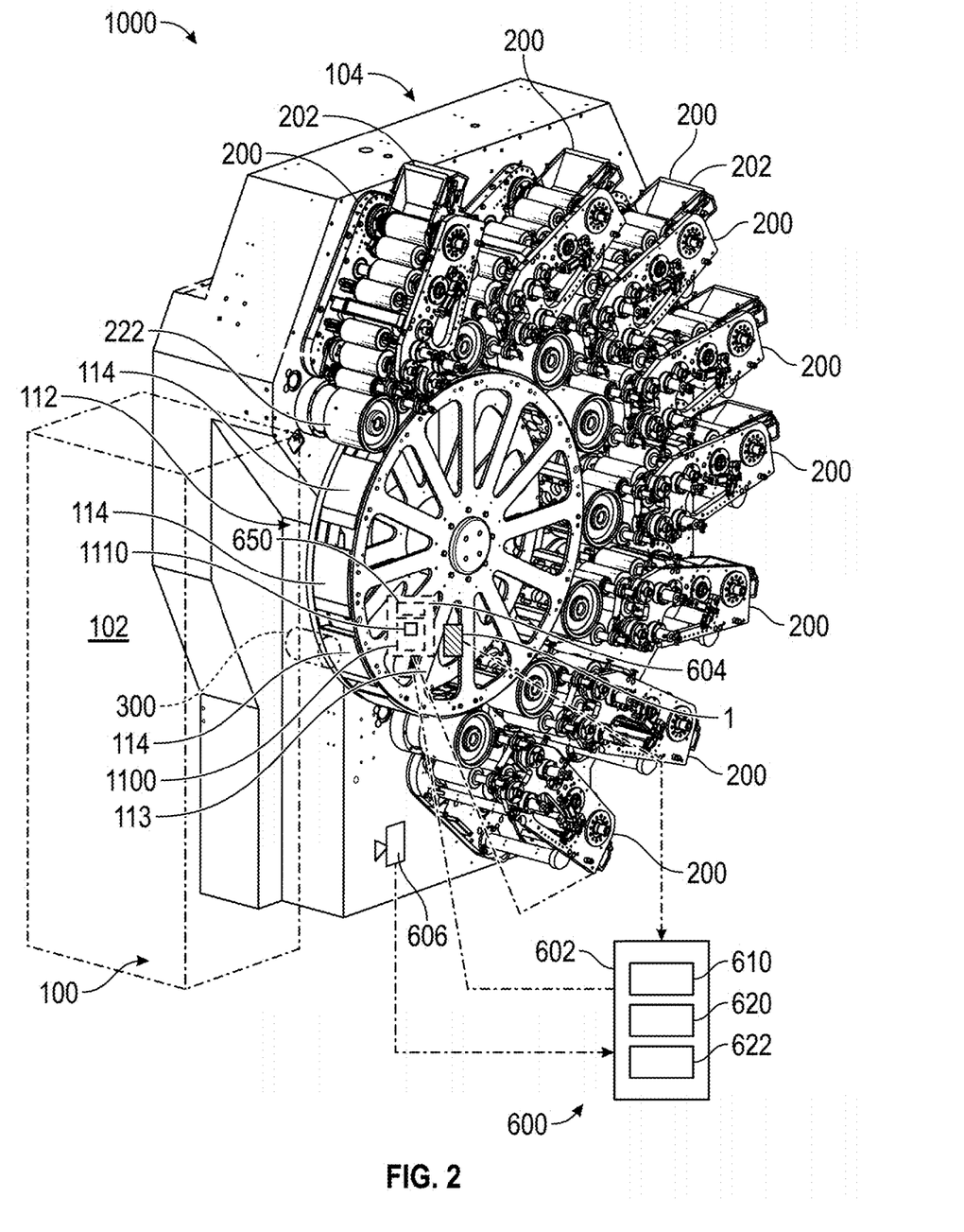
FIG. 2 is an isometric view of a portion of a can decorator machine and ink station assembly therefor, in accordance with a non-limiting, example embodiment of the disclosed concept.

FIG. 2 illustrates a remote registration and print pressure adjustment system 1000 in accordance with a non-limiting, example embodiment of the disclosed concept. The remote registration and print pressure adjustment system 1000 includes a can decorator machine (alternately as used herein a "can decorator") 100 and a registration and print pressure adjustment control system 600. The can decorator machine 100 includes a can transport assembly 102 (shown schematically) and an ink application system 104. The can transport assembly 102 is structured to move a number of undecorated can bodies 300 into contact with the ink application system 104 and, as shown, a blanket wheel 112 and/or an image transfer segment 114. The ink application system 104 is structured to apply ink in a selected pattern to the exterior of each can body 300, and includes a plurality of ink station assemblies 200 (eight are shown) and a blanket wheel 112. It will be appreciated that, while the can decorator 100 in the example shown and described herein includes eight ink station assemblies 200, that it could alternatively contain any known or suitable alternative number and/or configuration of ink station assemblies (not shown), without departing from the scope of the disclosed concept. It will further be appreciated that, for economy of disclosure and simplicity of illustration, only one of the ink station assemblies 200 will be shown and described in detail herein.

Figure 3:
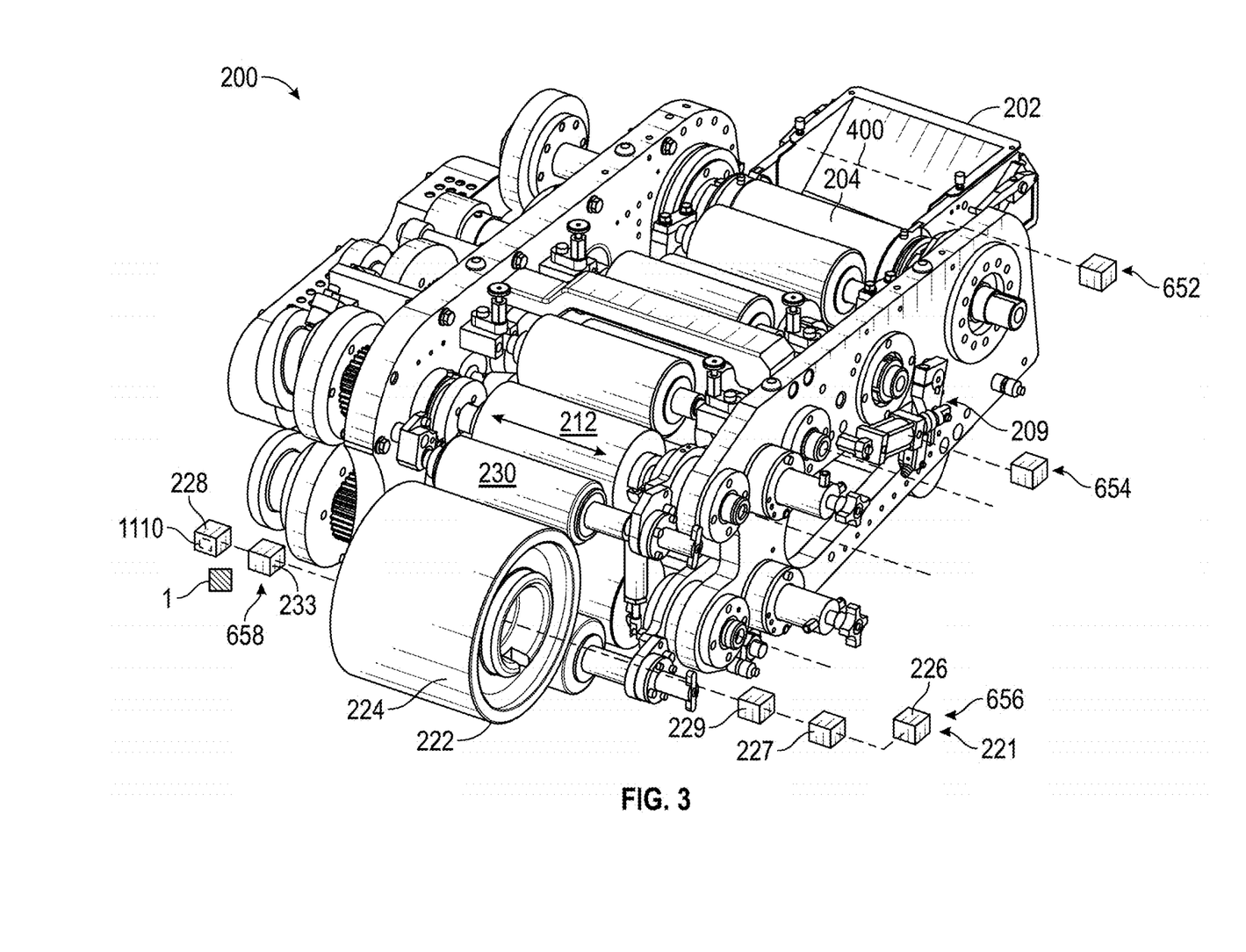
FIG. 3 is a partially schematic isometric view of one of the ink station assemblies of FIG. 2 in accordance with a non-limiting, example embodiment of the disclosed concept.

As shown in detail in FIG. 3, the ink station assembly 200 includes an ink fountain 202 and a printing plate cylinder assembly 221. The ink fountain 202 is structured to provide a supply of ink 400 (shown in phantom line drawing in simplified form in FIG. 3). Each printing plate cylinder assembly 221 includes a printing plate cylinder 222 having a printing plate (generally indicated by reference number 224) as well as a printing plate cylinder axial adjustment assembly 226 and a circumferential adjustment assembly 228, shown schematically in FIG. 3. The printing plate cylinder 222 cooperates with a number of form rolls 230 to apply the ink 400 to the printing plate 224. The printing plate cylinder 222 engages the blanket wheel 112 and/or the image transfer segment 114. The blanket wheel 112 and/or the image transfer segment 114 (FIG. 2) engages a can body 300 thereby transferring the ink to the can body 300. Thus, generally, each ink station assembly 200 defines an ink train, whereby ink 400 is transferred from the fountain roll 204 to the form roll 230. It is understood that each ink station assembly 200 applies a single color ink image to the blanket wheel 112 and/or an image transfer segment 114.

The axial adjustment assembly 226 is structured to move the printing plate cylinder 222 in an axial direction relative to the printing plate cylinder 222 axis of rotation. That is, the axial adjustment assembly 226 is structured to, and does, alter the sidelay registration of the main image. That is, as the axial position of each ink image is moved axially (while being brought into proper sidelay registration with the other ink images), the position of the main image is moved axially relative to the can body upon which the main image is applied. In an exemplary non-limiting embodiment, the axial adjustment assembly 226 includes a mounting 227 and an actuator 229, both shown in simplified form in FIG. 3. The axial adjustment assembly mounting 227 is structured to, and does, rotatably support the printing plate cylinder 222 (and/or the axle (not numbered) of the printing plate cylinder 222). The axial adjustment assembly mounting 227 is movable coupled to the printing unit frame assembly 22. The axial adjustment assembly actuator 229 is structured to move the axial adjustment assembly mounting 227 relative to the printing unit frame assembly 22 so that the printing plate cylinder 222 moves in an axial direction. It is understood that as the printing plate cylinder 222 moves in an axial direction, the location of the ink image (and/or the main image) changes position on the blanket wheel 112 and/or an image transfer segment 114. The change in position of the ink image (and/or the main image) on the blanket wheel 112 and/or an image transfer segment 114 changes the position of the can body applied image on the can body 300. That is, the position of the can body applied image on the can body 300 is moved in an axial direction on the can body 300.

The circumferential adjustment assembly 228 is structured to alter the circumferential registration of the can body applied image. The circumferential adjustment assembly 228 includes bearings on the printing cylinder shaft which are driven by a helical gear 1110 (schematically shown in FIGS. 2 and 3) mounted to the shaft (not shown). A plate cylinder helical gear 1110 is driven by a larger helical gear 1110 (schematically shown in FIGS. 2 and 3) mounted on the blanket wheel 112. The plate cylinder helical gear 1110 is rotationally keyed to the shaft, but it is allowed to move axially on the shaft. A linear screw mechanism (not shown) is used to move the helical gear 1110 axially on the shaft while the machine 100 is running. The axial movement of the plate cylinder gear 1110 causes the shaft to rotatably advance or retard its timing proportional to the helix angle of the gear 1110. This advances or retards the location of the ink image on the blanket for that particular color. These elements are collectively and schematically represented by box 228 on FIG. 3. The circumferential adjustment assembly 228 further includes an actuator 233 (shown schematically) that is structured to, and does, actuate the linear screw mechanism.

The registration and print pressure adjustment control system 600 (shown schematically in FIG. 2) is structured to determine a linear distance by which a registration mechanism or a print pressure adjustment mechanism is moved as a result of rotations of an associated rotatory component 1100 of the can decorator 100, determine instant position of the registration mechanism or the print pressure adjustment mechanism based on the linear distance, and remotely (and automatically) adjust instant print parameters of an ink image based at least in part on the linear distance.

The registration and print pressure adjustment control system 600 includes an electronic can decorator control assembly 602, a mechanical can decorator control assembly 604 and a magnetic encoder position sensor 1. In some examples, the registration and print pressure adjustment control system 600 may also include a number of image sensors 606 (e.g., without limitation, cameras) structured to capture ink images/the main images printed on the cans 300. The electronic can decorator control assembly 602 is communicatively coupled to the mechanical can decorator control assembly 604 and the magnetic encoder position sensor 1 in a wired or wireless connection. The electronic can decorator control assembly 602 is structured to determine if the ink image applied to can body has the proper amount of ink and that the ink images/the main image are/is in the proper location. A proper amount of ink and a proper position of ink image are set forth by a label specification provided by a customer. As mentioned previously, the ink image is applied at a proper position, e.g., if the main image does not have offset ink images. The electronic can decorator control assembly 602 includes a programmable logic circuit (PLC) 610 and a number of modules, e.g., without limitation, a database module 620 and a comparison module 622. The registration and print pressure adjustment control system 600 may be part of or in communication with an external control system. However, it will be appreciated that in some exemplary embodiments, the registration and print pressure adjustment control system 600 may be omitted.

In an exemplary embodiment, the database module 620 includes at least predefined print parameters in accordance with the label specification and a comparison module 622. The predefined print parameters include at least predefined registration parameters including predefined sidelay registration parameters and predefined circumferential registration parameters, predefined ink thickness, predefined print pressure based on the predefined ink thickness, predefined ink colors or predefined hews. The comparison module 622 is further structured to compare a position signal received from the magnetic encoder position sensor 1 to the predefined print parameters. The position signal may include rotational position parameters of the rotatory component 1100 (FIG. 2). The rotational position parameters include changes in the magnetic field and an angular information (e.g., degree of rotation of a sensor target) converted from the changes in the magnetic field. The PLC 610 receives the position signal and determines a linear distance of the registration mechanism or the print pressure adjustment mechanism, the linear distance having been caused by the rotations of associated rotatory components (e.g., a plate cylinder gear 1110 as schematically shown in FIG. 2) of the can decorator 100 by converting the angular information into the linear distance. Based on the determined linear distance, the PLC 610 may determine the instant position of the registration mechanism or the print pressure adjustment mechanism. The PLC 610 may then determine instant print parameters based on the instant position of the registration mechanism or the print pressure adjustment mechanism. The comparison module 622 may then compare the instant print parameters to the predefined print parameters stored in the database module 610. If the comparison module 622 determines that the instant print parameters do not fall within the acceptable registration or print pressure parameters (e.g., predefined registration or print pressure thresholds), the registration and print pressure adjustment control system 600 causes a corresponding actuator 650 (e.g., without limitation, a printing plate cylinder assembly circumferential adjustment assembly actuators 658 in FIG. 3) to adjust the position of the registration mechanism or the print pressure adjustment mechanism such that the instant print parameters are adjusted to be within the predefined print parameters. As used herein, "acceptable" means that the can body applied image/ink images/main image is substantially the intended image, as would be understood by those of skill in the art. For example and without limitation, an acceptable registration in accordance with an embodiment of the disclosed concept is preferably within about 0.001 inch of the intended image position and, more preferably, within about 0.0005 inch of the intended image position. It is understood that those of skill in the art are capable of creating, and do create, can image data that is an electronic construct representing the intended image.

Figure 4:
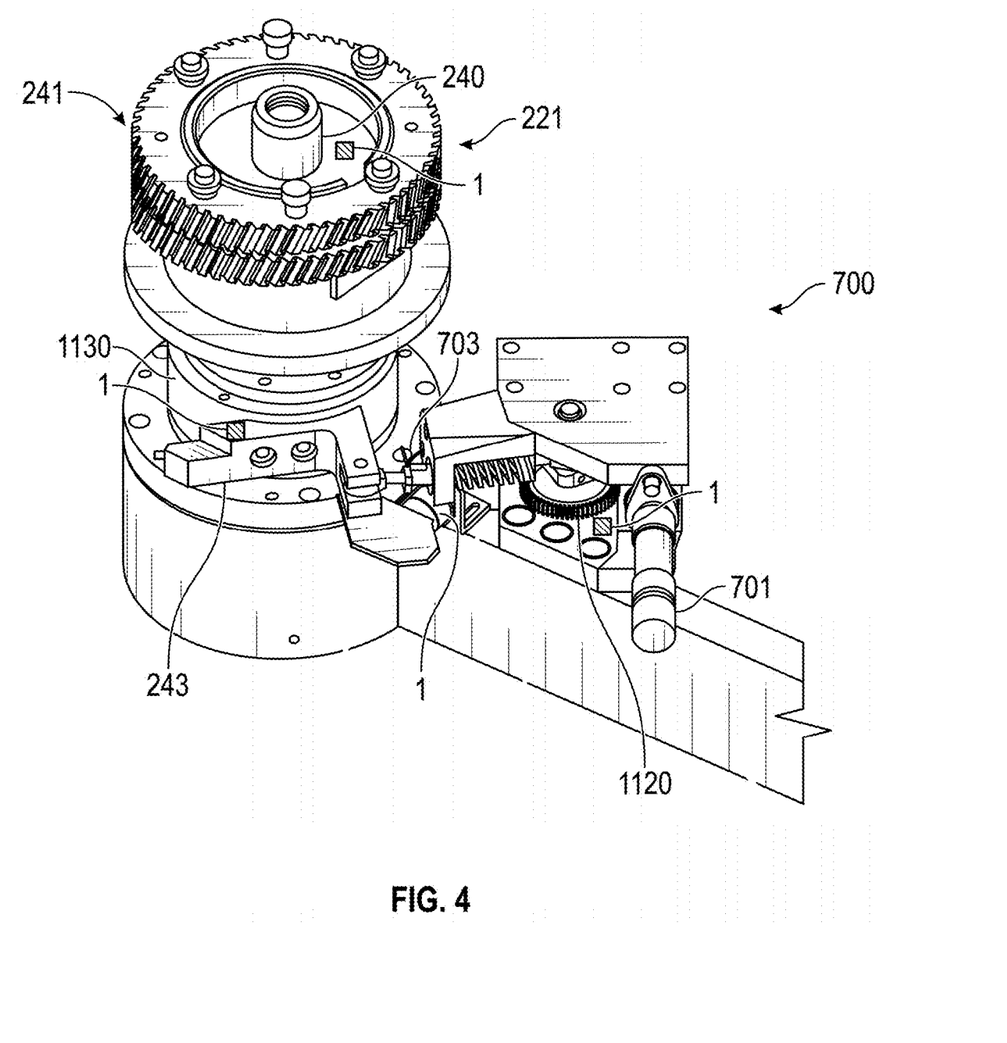
FIG. 4 is an isometric view of a printing plate cylinder pressure adjustment assembly operatively coupled to a printing cylinder assembly.

The mechanical can decorator control assembly 604 includes an actuator 650 (as used herein, the reference number 650 represents a generic actuator or any actuator of the mechanical can decorator control assembly 604) structured to actuate the associated construct, and thus structured to be operatively coupled to the associated construct. In exemplary embodiments, the mechanical can decorator control assembly 604 includes at least one, or, a number of, ink application adjustment assembly actuator(s) 652 (FIG. 3, shown schematically), a number of ductor roll assembly duty cycle adjustment actuators 654 (FIG. 3, shown schematically), a number of printing plate cylinder assembly axial adjustment assembly actuators 656 (FIG. 3, shown schematically), a number of printing plate cylinder assembly circumferential adjustment assembly actuators 658 (FIG. 3, shown schematically), and/or a number of printing plate cylinder pressure adjustment assembly actuators.

Each ink application adjustment assembly actuator 652 is coupled to an ink application adjustment assembly adjustment device (not shown) and structured to actuate the ink application adjustment assembly 500. Each ductor roll assembly duty cycle adjustment actuator 654 is structured to actuate the ductor roll assembly duty cycle adjustment assembly 209 so as to adjust the amount of ink applied to the printing plate cylinder assembly. Each printing plate cylinder assembly axial adjustment assembly actuator 656 is operatively coupled to the axial adjustment assembly 226. In another exemplary non-limiting embodiment, each printing plate cylinder assembly axial adjustment assembly actuator 656 is an axial adjustment assembly mounting actuator 229. Each printing plate cylinder assembly circumferential adjustment assembly actuator 658 is operatively coupled to the circumferential adjustment assembly 228 including bearings on the printing cylinder shaft that are driven by the plate cylinder helical gear 1110 mounted to the shaft (not shown). A printing plate cylinder pressure adjustment assembly actuator is structured to actuate a printing plate cylinder pressure adjustment assembly 700 (FIG. 4).

FIG. 4 is an isometric view of the printing plate cylinder pressure adjustment assembly 700. The printing plate cylinder pressure adjustment assembly 700 is structured to adjust printing plate cylinder pressure and operatively coupled to a printing plate cylinder assembly 221. The printing plate cylinder assembly 221 includes a printing plate cylinder drive shaft 240. Rotation of the printing plate cylinder drive shaft 240 causes rotation of the printing plate 224 (FIG. 3). The printing plate cylinder drive shaft 240 is driven via a printing plate cylinder drive gear 241 (FIG. 4). A printing plate cylinder pressure adjustment assembly actuator may include an air motor 701 operatively coupled to a worm gear 1120 such that operation of the air motor 701 causes turning of the worm gear 1120. That is, the operation of the air motor 701 causes a worm gear drive shaft (not shown) to move linearly, and as the drive shaft moves linearly, the teeth of a worm drive gear (not shown) interact with the teeth of the worm gear 1120 to cause the worm gear 1120 to rotate. The worm gear 1120 is operatively coupled to an elongated member such as, for example and without limitation, a turnbuckle assembly 703 such that turning of the worm gear 1120 causes movement of the turnbuckle assembly 703 via an eccentric pivot. The turnbuckle assembly 703 is in turn operatively coupled to an eccentric bushing 1130 via an eccentric bushing bracket 243 such that movement of the turnbuckle assembly 703 causes corresponding movement of the eccentric bushing 1130. The eccentric bushing 1130 is disposed around the printing plate cylinder drive shaft 240 of the printing plate cylinder assembly 221 and has an eccentric shape such that rotation of the eccentric bushing 1130 will cause the printing plate cylinder drive shaft 240, and thus the printing plate 224 (FIG. 3) to move closer or further from the blanket wheel 112.

The magnetic encoder position sensor 1 is communicatively coupled to the electronic can decorator control assembly 602. It may be a standard magnetic encoder position sensor, and include a permanent magnet attached to a rotatory component (i.e., a sensor target 1100 (FIG. 2)) and a magnetic sensor disposed in proximity to the sensor target 1100. The magnetic encoder position sensor 1 may be a magneto-resistive sensor or a Hall effect sensor. The magnetic encoder position sensor 1 is structured to detect rotational position parameters of the sensor target 1100, the rotational position parameters including changes of the magnetic field generated by the permanent magnet and transmit a position signal including the rotational position parameters to a control circuit (e.g., without limitation, the PLC 610). That is, the direction of the magnetic field detected by the magnetic sensor changes as the permanent magnet attached to the sensor target 1100 rotates. The change of the magnetic field is converted into an angular information (i.e., degree of the revolution of the sensor target 1100) of the rotations of the sensor target 1100. Upon receiving the position signal including the rotational position parameters, the PLC 610 is structured to determine a linear distance of the registration mechanism moved by the rotations of the sensor target 1100 by converting the angular information into the linear distance. The PLC 610 is further structured to determine a position of associated registration mechanism or print pressure adjustment mechanism based on the linear distance. The comparison module 622 may determine instant print parameters based on the position of the associated registration mechanism and compare the instant print parameters to the predefined registration parameters stored in the database module 620. The instant print parameters include instant registration parameters, instant print pressure parameters, and other parameters associated with registration and/or print pressure. Based on the comparison, the comparison module 622 may determine that the instant print parameters are to be adjusted in accordance with the predefined print parameters. For example, if the comparison module 622 determines that instant registration parameters do not fall within the acceptable registration (e.g., predefined registration thresholds), the registration and print pressure adjustment control system 600 causes a corresponding actuator 650 to adjust the registration mechanism such that the ink image is printed within the acceptable registration. In another example, if the comparison module 622 determines that instant print pressure does not fall within the acceptable print pressure parameters (e.g., predefined print pressure thresholds), the registration and print pressure adjustment control system 600 causes a corresponding actuator 650 to adjust the print pressure adjustment mechanism such that the print pressure falls within the predefined print pressure thresholds.

The sensor target 1100 may include any rotatory components associated with registration and/or print pressure adjustment, e.g., without limitation, the plate cylinder helical gear 1110 (schematically shown in FIG. 2), the worm gear 1120 (FIG. 4), the eccentric bushing 1130 (FIG. 4), or other components whose changes in rotational position correspond to registration and/or print pressure changes. For example, the magnetic encoder position sensor 1 may be disposed in proximity to a plate cylinder helical gear 1110 (schematically shown in FIG. 2) of the circumferential adjustment assembly 228. The magnetic encoder position sensor 1 is structured to detect rotational position parameters of the plate cylinder helical gear 1100 based on changes of the magnetic field, and transmit a position signal including the rotational position parameters to the PLC 610 of the registration and print pressure adjustment control system 600. The magnetic encoder position sensor 1 converts the changes of the magnetic field into an angular information of the rotation (i.e., degree of revolution) of the plate cylinder helical gear 1100. Upon receiving the position signal, the PLC 610 is structured to convert the angular information into linear distance of a corresponding registration mechanism (e.g., without limitation, a printing cylinder shaft (not shown)) moved by the rotations of the plate cylinder helical gear 1110. The PLC 610 then determines the position of the printing cylinder shaft based on the linear distance and instant print pressure based on the position of the printing cylinder shaft. The comparison module 622 then compares the instant print pressure to the predefined print pressure threshold stored in the database module 610. If the comparison module 622 determines that the instant registration parameters fall outside of the acceptable registration (e.g., the predefined registration threshold), the remote registration and print pressure adjustment system 600 is structured to cause the can decorator 100 (e.g., without limitation, the actuator 658 or actuator 233) to adjust the instant registration parameters to fall within the predefined registration threshold.

In another example, the magnetic encoder position sensor 1 may be disposed in proximity to a worm gear 1120 operatively coupled to an air motor 701 of the printing plate cylinder adjustment assembly 700. The magnetic encoder position sensor 1 is structured to detect rotational position parameters of the worm gear 1120 based on changes of the magnetic field, and transmit a position signal including the rotational position parameters to the PLC 610 of the registration and print pressure adjustment control system 600. The magnetic encoder position sensor 1 converts the changes of the magnetic field into angular information of the rotation of the worm gear 1120. Upon receiving the position signal, the PLC 610 is structured to convert the angular information into a linear distance between the eccentric bushing 1130 and the blanket wheel 112 as a result of the rotations of the worm gear 1120. The PLC 610 further converts the linear distance into an instant print pressure of the printing plate 224 against the blanket wheel 112. The comparison module 622 then compares the instant print pressure to the predefined print pressure stored in the database module 620. If the comparison module 622 determines that the print pressure of the printing plate 224 against the blanket wheel 112 falls outside of the acceptable print pressure (e.g., the predefined print pressure threshold), the PLC 610 is structured to cause the can decorator 100 (e.g., without limitation, the air motor 701) to adjust the position of the printing plate such that the instant print pressure parameters fall within the predefined print pressure threshold. That is, the PLC 610 causes the air motor 701 to increase or decrease its speed such that the position of the printing plate 224 is adjusted and the print pressure parameters are adjusted to fall within the predefined print pressure threshold.

In some examples, the magnetic encoder position sensor 1 may be disposed in proximity to the eccentric bushing 1130 and detect the rotational position parameters of the eccentric bushing 1130 based on changes of the magnetic field, and transmit a position signal including the rotational position parameters to the PLC 610 of the registration control system 600. The magnetic encoder position sensor 1 converts the changes of the magnetic field into angular information of the rotation of the eccentric bushing 1130. Upon receiving the position signal, the PLC 610 is structured to convert the angular information into linear distance between the eccentric bushing 1130 and the blanket wheel 112. The PLC 610 further converts the linear distance into instant print pressure of the printing plate 224 against the blanket wheel 112. The comparison module 622 then compares the instant print pressure to the predefined print pressure stored in the database module 620. If the comparison module 622 determines that the print pressure of the printing plate 224 against the blanket wheel 112 falls outside of the acceptable print pressure (e.g., a predefined print pressure threshold), the registration and print pressure adjustment control system 600 is structured to cause the can decorator 100 (e.g., without limitation, the air motor 701) to adjust instant print pressure parameters. That is, the PLC 610 causes the air motor 701 to increase or decrease its speed such that the position of the printing plate is adjusted, and thus the instant print pressure is also adjusted to be within the predefined print pressure threshold. It will be understood that these examples are for illustrated purposes only, and thus a sensor target 1100, associated registration mechanism, and associated actuator 650 may include any other rotatory machines, registration mechanism, and actuators 650 as appropriate for remotely adjusting registration and/or print pressure without departing from the scope of the disclosed concept.

Accordingly, the magnetic encoder position sensor 1 of the disclosed concept improves accuracy of the position detection significantly as compared to that of linear position sensors. For example, the linear inductive sensors measure linear distance in order to detect position of the registration mechanism. As such, when measuring small amounts of linear movement of the sensor target 1100, the accuracy of such measurement is limited by resolution of the sensors. The linear inductive sensors, however, are subject to a minimum resolution and repeatability. By measuring angular information of the rotations of the sensor target 1100 and converting the angular information into linear distance moved by the sensor target 1100, the magnetic encoder position sensor 1 avoids the resolution and repeatability of the linear inductive sensors, thereby significantly increasing the accuracy of the position detection of sensor target 1100.

Figure 5:
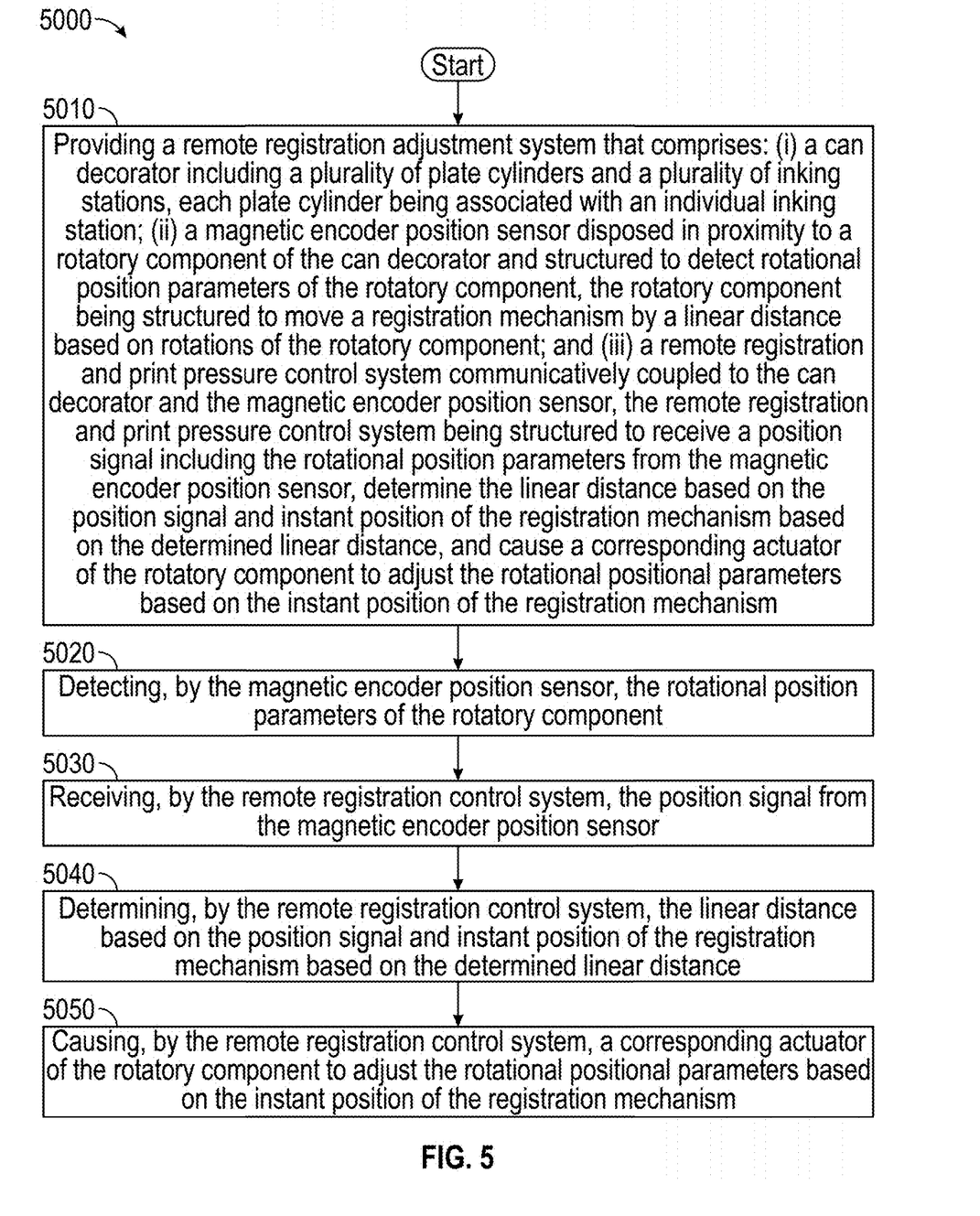
FIG. 5 is a flow chart for a method of remote registration adjustment in accordance with a non-limiting, example embodiment of the disclosed concept.

FIG. 5 is a flow chart for a method 5000 of remote registration adjustment for a can decorator using a magnetic encoder position sensor according to a non-limiting, example embodiment of the disclosed concept. The can decorator is similar to the can decorator 100 as described with reference to FIGS. 2-4. The method 5000 may be performed by the can decorator 100 or any components thereof.

At 5010, a remote registration adjustment system for a can decorator is provided. The remote registration adjustment system includes: (i) a can decorator including a plurality of plate cylinders and a plurality of inking stations, each plate cylinder being associated with an individual inking station; (ii) a magnetic encoder position sensor disposed in proximity to a rotatory component of the can decorator and structured to detect rotational position parameters of the rotatory component, the rotatory component being structured to move a registration mechanism by a linear distance based on rotations of the rotatory component; and (iii) a remote registration and print pressure control system communicatively coupled to the can decorator and the magnetic encoder position sensor, the remote registration and print pressure control system being structured to receive a position signal including the rotational position parameters from the magnetic encoder position sensor, determine the linear distance based on the position signal and instant position of the registration mechanism based on the determined linear distance, and cause a corresponding actuator of the rotatory component to adjust the rotational positional parameters based on the instant position of the registration mechanism.

At 5020, the magnetic encoder position sensor detects rotational position parameters of the rotatory component.

At 5030, the remote registration control system receives the position signal from the magnetic encoder position sensor.

At 5040, the remote registration control system determines the linear distance based on the position signal and instant position of the registration mechanism based on the determined linear distance.

At 5050, the remote registration mechanism causes a corresponding actuator of the rotatory component to adjust the rotational positional parameters based on the instant position of the registration mechanism.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A remote registration and print pressure adjustment system for a can decorator having a blanket wheel, an inking station, a plate cylinder associated with the inking station and structured to engage the blanket wheel, and a printing plate cylinder drive shaft whose rotation causes rotation of the plate cylinder, the system comprising:
    a printing plate cylinder adjustment mechanism including:
        an actuator;
        a worm gear structured to rotate in response to operation of the actuator;
        an eccentric pivot structured to rotate in response rotation of the worm gear;
        an eccentric bushing disposed around the printing plate cylinder drive shaft, wherein rotation of the eccentric bushing causes the plate cylinder to move closer or further from the blanket wheel; and
        an elongated member coupled between the eccentric pivot and the eccentric bushing and operable to move linearly and rotate the eccentric bushing in response to rotation of the eccentric pivot;
    a magnetic encoder position sensor disposed in proximity to the worm gear and structured to detect angular information of rotation of the worm gear and to output a position signal including the angular information; and
    a remote registration and print pressure control system communicatively coupled to the magnetic encoder position sensor, the remote registration and print pressure control system being structured to receive the position signal from the magnetic encoder position sensor and to determine a print pressure of the plate cylinder against the blanket wheel from the angular information of rotation of the worm gear.

2. The system of claim 1, wherein the remote registration and print pressure control system is structured to compare the determined print pressure to a predefined print pressure threshold range, and wherein the remote registration and print pressure control system is structured to operate the actuator in response to determining that the determined print pressure is outside the predefined print pressure threshold range.

3. The system of claim 2, wherein the remote registration and print pressure control system comprises a programmable logic circuit, a database module, and a comparison module.

4. The system of claim 3, wherein the programmable logic circuit is structured to determine the print pre of the plate cylinder against the blanket wheel from the angular information of rotation of the worm gear, and wherein the database module includes the predefined print pressure threshold range.

5. The system of claim 4, wherein the comparison module is structured to compare the determined print pressure to the predefined print pressure threshold range.

6. The system of claim 1, wherein the magnetic encoder position sensor comprises a magneto-resistive sensor.

7. The system of claim 1, wherein the magnetic encoder position sensor comprises a Hall effect sensor.

8. The system of claim 1, wherein the magnetic encoder position sensor comprises a permanent magnet disposed at the worm gear and a magnetic sensor aligned with the permanent magnet and disposed in proximity to the worm gear, the magnetic sensor being structured to detect change in magnetic field of the permanent magnet based on the rotations of the worm gear.

9. The system of claim 1, wherein the actuator is an air motor.

10. A method of remotely adjusting registration for a can decorator having a blanket wheel, an inking station, a plate cylinder associated with the inking station and structured engage the blanket wheel, and a printing plate cylinder drive shaft whose rotation causes rotation of the cylinder, the method comprising:
    providing a remote registration adjustment system that comprises: (i) a printing plate cylinder mechanism including: an actuator; a worm gear structured to rotate in response to operation of the actuator; an eccentric pivot structured to rotate in response to rotation of the worm gear; an eccentric bushing disposed around the printing plate cylinder drive shaft, wherein rotation of the eccentric bushing causes the plate cylinder to move closer or further from the blanket wheel; and an elongated member coupled between the eccentric pivot and the eccentric bushing and operable to move linearly and rotate the eccentric bushing in response to rotation of the eccentric pivot; (ii) a magnetic encoder position sensor disposed in proximity to the worm gear and structured to detect angular information of rotation of the worm gear and output a position signal including the angular information; and
    (iii) a remote registration and print pressure control system communicatively coupled to the magnetic encoder position sensor, the remote registration and print pressure control system being structured to receive the position signal from the magnetic encoder position sensor and to determine a print pressure of the plate cylinder against the blanket wheel from the angular information of rotation of the worm gear;
    detecting, by the magnetic encoder position sensor, the angular information of rotation of the worm gear;

receiving, by the remote registration and print pressure control system, the position signal from the magnetic encoder position sensor; and determining, by the remote registration and print pressure control system, the print pressure of the plate cylinder against the blanket wheel from the angular information of rotation of the worm gear.

\* \* \* \* \*